US012039461B2

(12) United States Patent
Simpson et al.

(10) Patent No.: US 12,039,461 B2
(45) Date of Patent: Jul. 16, 2024

(54) METHODS FOR INDUCING A COVERT MISCLASSIFICATION

(71) Applicant: Purdue Research Foundation, West Lafayette, IN (US)

(72) Inventors: Garth Jason Simpson, Lafayette, IN (US); James Ulcickas, West Lafayette, IN (US); Casey Smith, West Lafayette, IN (US); Alex Sherman, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 770 days.

(21) Appl. No.: 16/566,840

(22) Filed: Sep. 10, 2019

(65) Prior Publication Data

US 2020/0082282 A1     Mar. 12, 2020

Related U.S. Application Data

(60) Provisional application No. 62/729,409, filed on Sep. 10, 2018.

(51) Int. Cl.
| | |
|---|---|
| *G06N 5/04* | (2023.01) |
| *G05B 13/02* | (2006.01) |
| *G06N 3/02* | (2006.01) |
| *G06N 3/045* | (2023.01) |
| *G06F 17/14* | (2006.01) |
| *G06F 17/16* | (2006.01) |

(52) U.S. Cl.
CPC ............. *G06N 5/04* (2013.01); *G05B 13/025* (2013.01); *G06N 3/02* (2013.01); *G06N 3/045* (2023.01); *G06F 17/14* (2013.01); *G06F 17/16* (2013.01)

(58) Field of Classification Search
CPC .......... G06N 5/04; G06N 3/02; G06N 3/0454; G05B 13/025
See application file for complete search history.

(56) References Cited

U.S. PATENT DOCUMENTS

| | | | |
|---|---|---|---|
| 2013/0315858 A1* | 11/2013 | Hakonarson | A61K 38/208 435/254.2 |
| 2015/0142715 A1* | 5/2015 | Esterline | H03L 1/04 706/23 |
| 2016/0224654 A1* | 8/2016 | Tsuchida | G06N 20/00 |
| 2018/0038712 A1* | 2/2018 | Altrichter | G01C 25/00 |
| 2018/0173894 A1* | 6/2018 | Boehler | G06F 21/6254 |
| 2018/0247195 A1* | 8/2018 | Kumar | G06N 3/08 |

* cited by examiner

*Primary Examiner* — Scott C Anderson
(74) *Attorney, Agent, or Firm* — Piroozi-IP, LLC

(57) ABSTRACT

A method for inducing a covert misclassification performed on a non-transitory computer readable medium, the method includes identifying a target position. The method further includes creating a spectral perturbation tensor. The spectral perturbation tensor is configured to shift a projection of an initial spectrum towards the target position. Additionally, the method includes combining the spectral perturbation tensor to the initial spectrum. Further, the method includes classifying the combination of the spectral perturbation tensor and the initial spectrum with an established classifier, thereby designing the spectral perturbation tensor such that the combination is misclassified.

14 Claims, 8 Drawing Sheets

METHODS FOR INDUCING A COVERT MISCLASSIFICATION

CROSS-REFERENCE TO RELATED APPLICATIONS

The present U.S. patent application is related to and claims the priority benefit of U.S. Provisional Patent Application Ser. No. 62/729,409, filed Sep. 10, 2018, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

As the data throughput of modern instrumentation has increased, decisions and supporting validation are increasingly performed based on dimension reduction methods, in which full spectra or multidimensional spectra are mined for classification. The larger and higher dimensional the nature of the data, the more reliant we become on algorithmic data analysis approaches for quantification, classification, and scientific decision-making. Often, legal and regulatory decisions are made based on the outcomes of dimension reduction approaches, including drug testing, DNA matching, regulation of pharmaceutical manufacturing, voice/facial recognition, etc. Given the significance of the outcomes in such instances, the motivation for reliable classification is high.

Classification strategies based on training data generally exhibit low robustness to samples with even subtle systematic deviations from spectra in the training data. For example, the addition of a relatively subtle impurity absent in the training data can significantly degrade the confidence in the subsequent classification.

SUMMARY

Although spectroscopy is fundamentally different from digital image processing in terms of the nature of the data, the dimension reduction approaches, and the decisions resulting from the analysis, successful strategies in machine learning for image analysis suggest some potentially interesting approaches for improving the robustness of the classification design. Specifically, generative adversarial networks (GANs), in which neural networks are trained to produce computer-generated images designed to be classified as genuine elements of a targeted class, have significantly improved the training of artificial neural networks when limited training data are available. Analogous advantages may also be reasonably expected in spectroscopic analyses.

In the present application, we demonstrate the generation of adversarial approaches designed to modify spectra for the purposes of intentional misclassification in subtle ways that are challenging to detect visually or forensically. This effort is intended to serve three central purposes: i) to provide a means of intentional malfeasance with the potential for altering decisions based on spectral measurements, ii) to serve as a basis for development of new classifiers designed with reduced susceptibility to adversarial attempts at misclassification, and iii) to improve the reliability of classifiers trained using limited data sets.

The general approach is illustrated in FIG. 2, in which the implementation is visually aided by projecting the initial and modified spectra in a reduced dimensional space. Random noise in each pixel in the experimental spectra generally results in projections with equal probability of pointing in all directions within the reduced dimensional space. As such, noise affects the distribution about the mean, but often negligibly impacts the position of the mean. In contrast, the perturbation vector contains many patterned "noise" contributions that individually contribute a small nudge, but collectively inexorably direct the spectrum from the initial position to the misclassified target position.

One aspect of the present application relates to a method for inducing a covert misclassification performed on a non-transitory computer readable medium, the method includes identifying a target position. The method further includes creating a spectral perturbation tensor. The spectral perturbation tensor is configured to shift a projection of an initial spectrum towards the target position. Additionally, the method includes combining the spectral perturbation tensor to the initial spectrum. Further, the method includes classifying the combination of the spectral perturbation tensor and the initial spectrum with an established classifier, thereby designing the spectral perturbation tensor such that the combination is misclassified.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

In practice, the adversarial modification of an initial spectrum, expressed in digital form as a vector $X_i$ was performed through addition of a change vector $\Delta$ to produce a modified form $X_i'$, with the magnitude of the change given by a scaling factor $s$.

$$X_i' = X_i + s\Delta \quad (1)$$

The direction of $\Delta$ influences the final form of $X'$. For an adversarial modification, $\Delta$ was designed to: i) point in a direction generally toward the target classification position, and ii) suppress contributions from large amplitude spectral features. Toward this end, $\Delta$ was initially defined to be the difference from a target spectrum $Y_j$, chosen at random from the those within the target class, and the initial spectrum $X_i$.

$$\Delta^0 = Y_j - X_i \quad (2)$$

This initial starting point was modified to reduce the weighting from the large amplitude spectral features using a simple threshold-based assessment. Each r pixels in $X_i$ with a magnitude greater than a critical threshold (manually selected) was reduced tenfold through multiplication by a weight.

$$\Delta_r = w_r \Delta^0_r \quad (3)$$

Figures 1A, 1B, 1C:
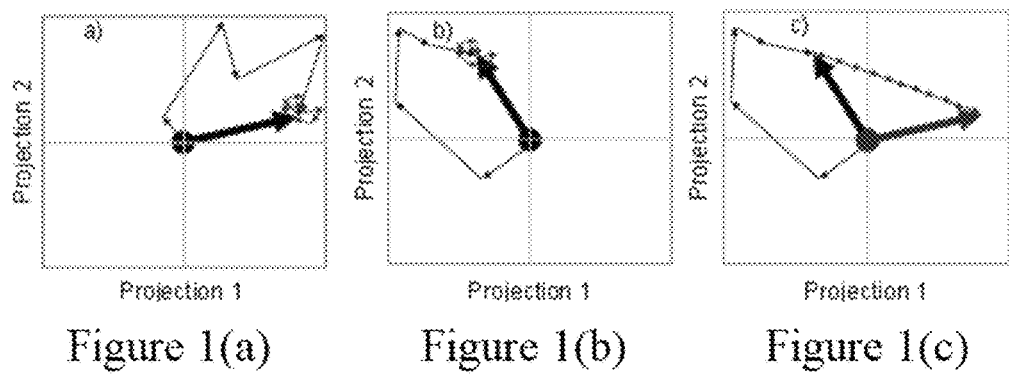
FIG. 1(a) illustrates a graphical representation of an adversarial spectral attack where the target spectrum contains several key spectral features that collectively sum to a region in the reduced dimensional space.
FIG. 1(b) illustrates a graphical representation of an adversarial spectral attack for the unperturbed initial spectrum.
FIG. 1(c) illustrates a graphical representation of an adversarial spectral attack which results in a modification of the noise contributions.
Figure 2A:
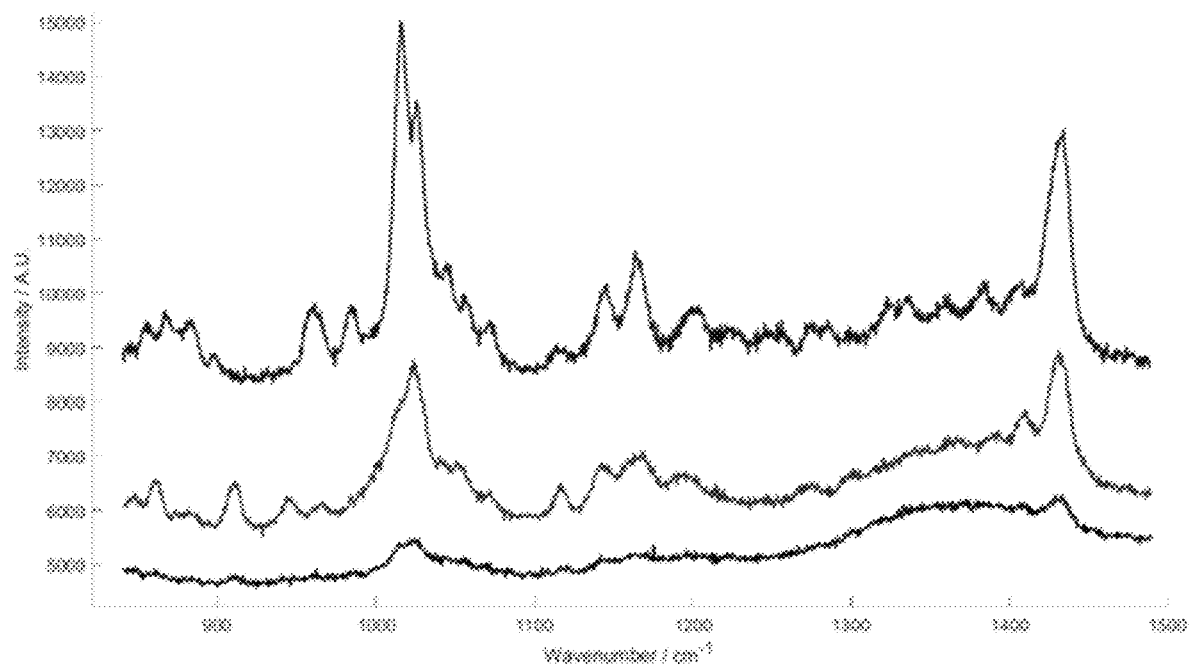
FIG. 2(a) illustrates representative spectra for Form I (middle), Form II (top), and background (bottom).
Figure 2B:
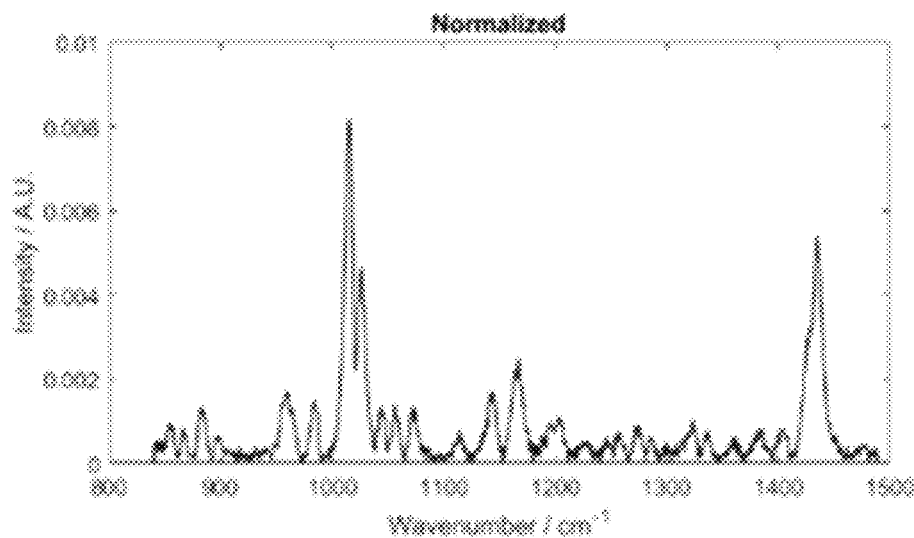
FIG. 2(b) illustrates overview of spectral modification to remove high frequency noise and low-frequency background.
Figure 2C:
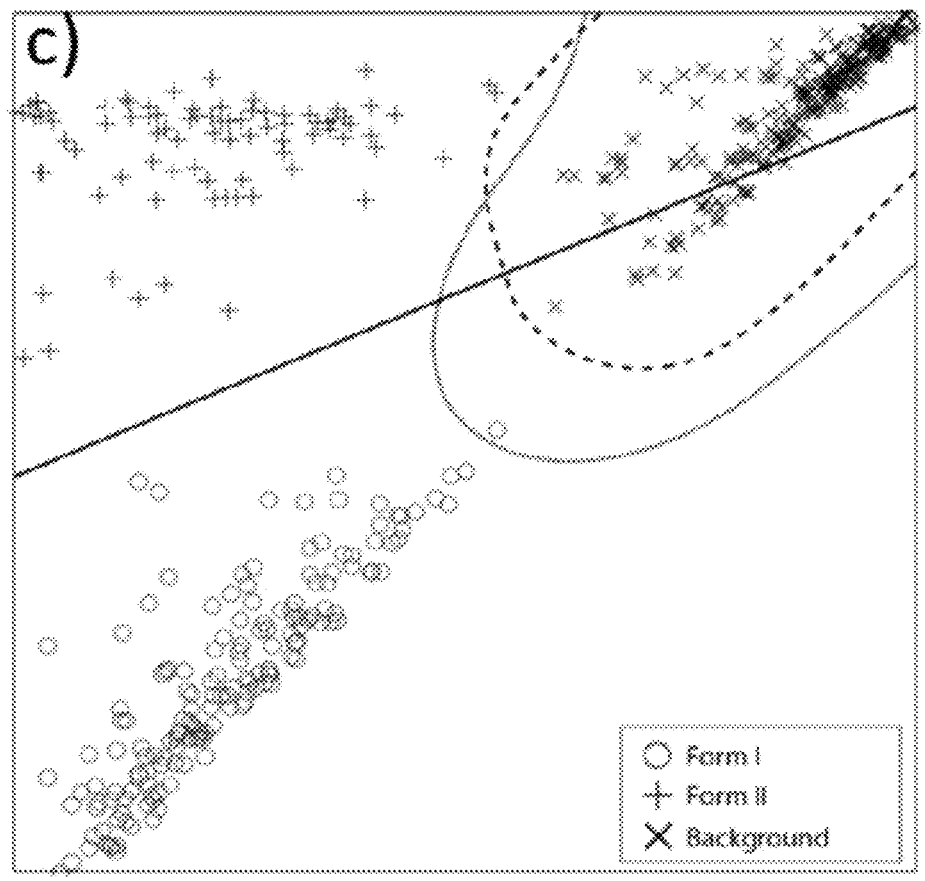
FIG. 2(c) illustrates projection of the training data with known ground truth into LDA-space together with the SVM classification boundaries.
Figure 2D:
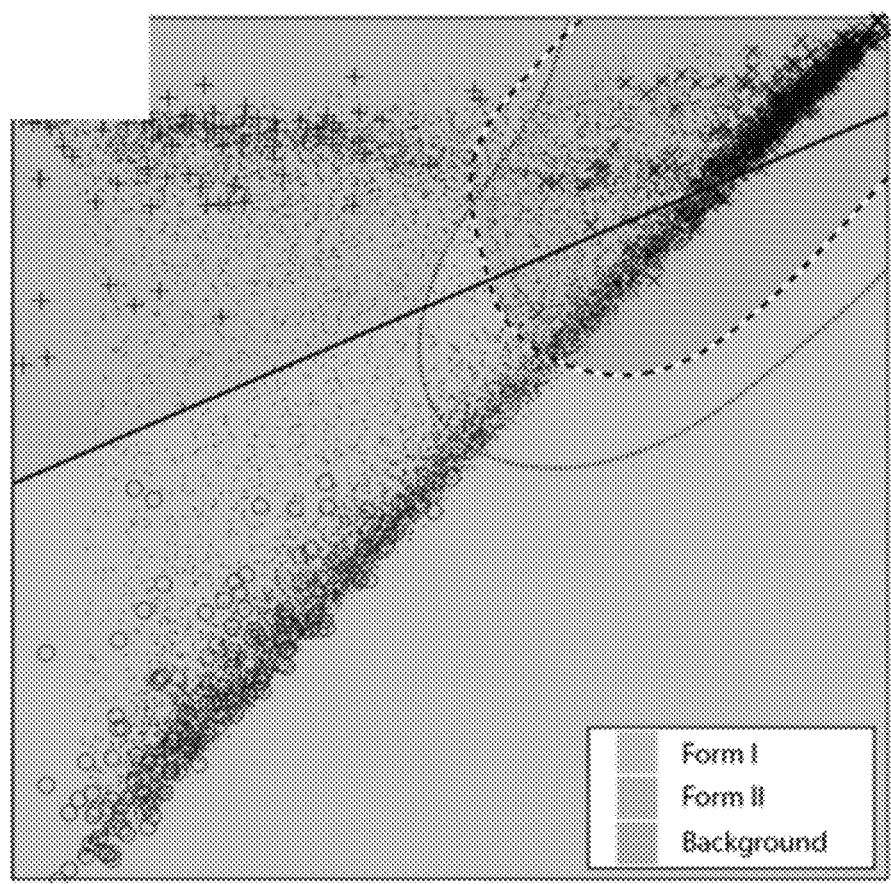
FIG. 2(d) illustrates projection of the entire spectral data set in that same space.

Using this functional form for the perturbation vector, the modified spectrum $X_i'$ given in Eq. (1) was generated by increasing the scaling factors until $X_i'$ crossed a decision boundary such as shown in FIG. 1 and resulted in misclassification.

Classification of acquired Raman spectra was performed to identify the chemical composition of the sample measured at specific locations. The Raman spectroscopic image was thus converted to a discrete valued image, in which the value of each pixel is its corresponding class label, to inform the SLADS algorithm. Raman spectral classification was achieved by a combination of linear discriminant analysis (LDA) for initial dimension reduction and support vector machine (SVM) classification. In brief, LDA constructs the N−1 dimensional space for N classes of data that maximizes the Fisher linear discriminant, which in turn maximizes the resolution between classes. SVM is a complementary machine-learning algorithm specifically designed for classification, in which optimal hyperplanes are constructed in the data space to separate different clusters of data points. With linearly inseparable data, SVM utilizes a pre-defined kernel function to draw non-linear decision boundaries, which is a more computationally economical equivalent of projecting data into a higher dimensional space, in which the data become linearly separable.

SVM is not inherently designed to work with N-class problems, such that additional steps were taken to enable classification. In the present work, a 1-vs-1 SVM approach was adopted to enable SVM analysis with N>2: one decision boundary was made for each pair of classes, generating $$\binom{n}{2}$$

decision boundaries. Classification of a data point was achieved using this procedure: all the $$\binom{n}{2}$$

decision boundaries were applied to the unseen data point, and each decision boundary returns one prediction for a class label. Then a polling procedure was conducted, in which the class that obtained the highest number of prediction votes was used as the classification result. If the polling resulted in a tie, a tie-breaking algorithm was implemented to make a final classification decision.

Figure 3:
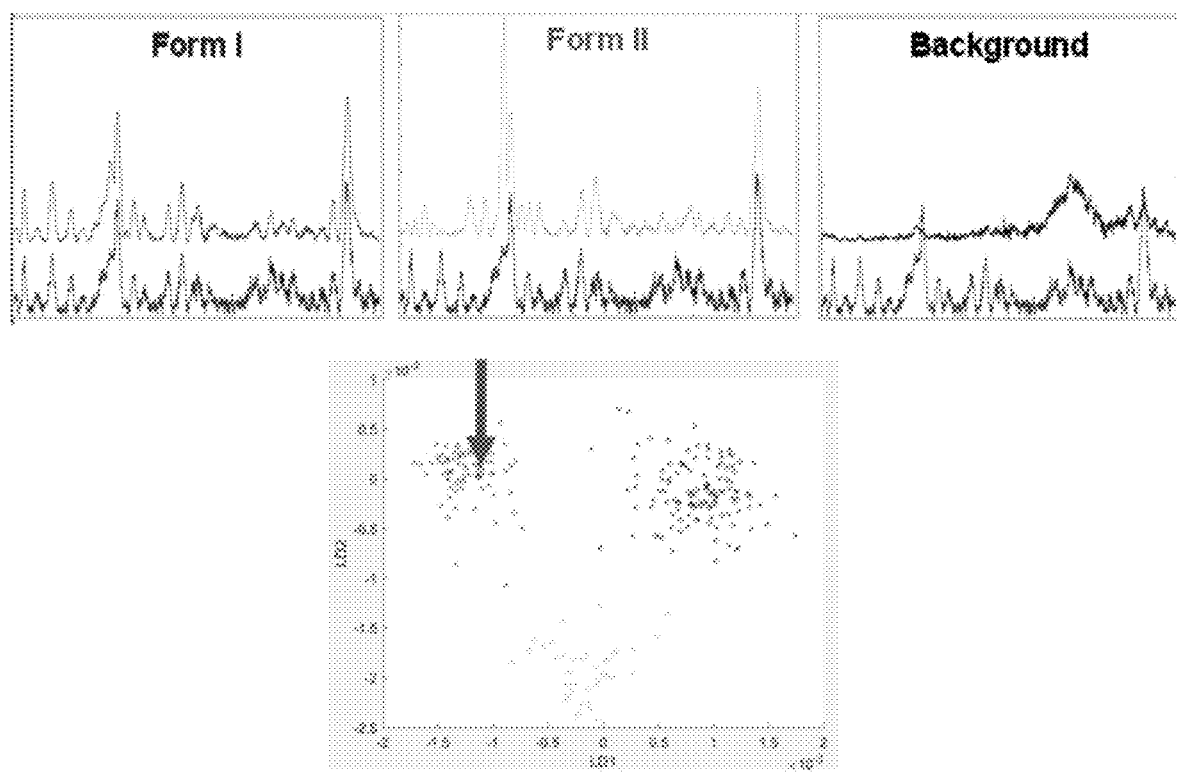
FIG. 3 illustrates graphs that show that classification of the unperturbed spectra is based on pattern-matching.

The results of classification of >16,000 Raman spectra used for Raman imaging are shown in FIG. 2. The raw spectra were filtered to suppress high frequency noise using a Savitsky-Golay polynomial filter, followed by a rolling ball filter for removal of a slowly varying background, and finally normalization prior to classification. Classification was performed based on the location of each spectrum in a reduced dimensional space, generated from the first two principal components of a 3-class linear discriminant analysis. Dimension reduction was performed primarily for signal to noise enhancement by retaining only the projections that optimally resolve the three classes from each other. Classification boundaries were generated based on the locations of spectra within the reduced-dimensional LDA-space. In this space, the spectra are generally well-separated, with ambiguous positions tentatively attributed to spectra from locations physically containing contributions from multiple classes within the probe volume of the Raman microscope. A more detailed illustration of this overall process integrating human perception is shown in FIG. 3. Based on visual inspection, a representative test spectrum, given in blue, is most similar to the class mean spectrum given for Form I, given in red. Consistent with this expectation, projection of the test spectrum onto the LDA-coordinates places the test spectrum squarely within the class of Form I red spectra.

Figure 4:
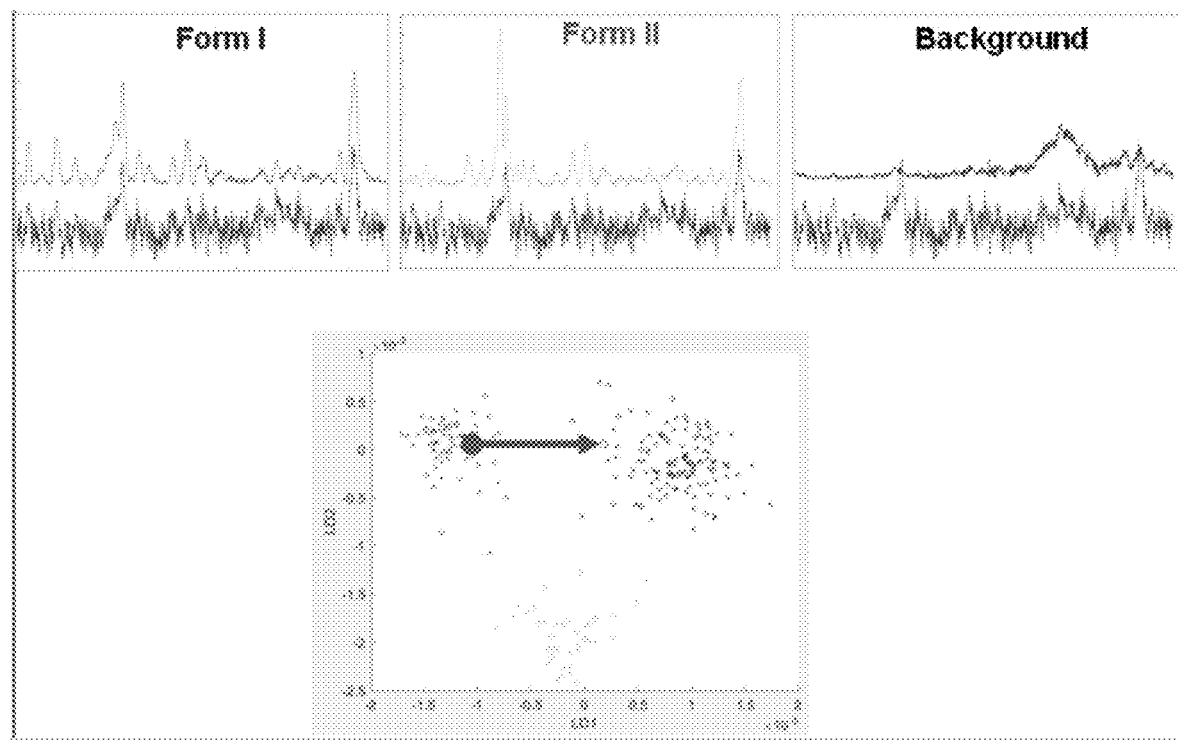
FIG. 4 illustrates graphs that show that modification of the initial spectrum results in misclassification.

The influence of an adversarial perturbation is shown in FIG. 4. The same test spectrum from FIG. 3 was modified through addition of the perturbation vector Δ. Since the major spectroscopic features are retained following modification, visual inspection would typically result in classification of the blue test spectrum in FIG. 4 as Form I, consistent with the initial unperturbed classification. However, the projection onto LDA space resulted in a position clearly within the manifold of spectra with a classification of Background. Implementation of SVM classifiers as illustrated in FIG. 2 would improperly classify the modified test spectrum as Background rather than the Form I ground-truth origins of the original spectrum.

It is worth noting that the process described herein is not specific to the particular perturbation tensor generated by a simple threshold-based weighting. Several alternative architectures for perturbation could be easily envisioned depending on the nature of the metrics used for evaluating the spectra. For attacks targeting the high frequency noise within a spectrum, a perturbation vector based on Fourier analysis may also be used to preferentially weight the high-frequency content of the test and target spectra.

The approach described herein demonstrates a simple method for perturbing a spectrum for intentional misclassification. This capability can be potentially advantageous as a means of intentionally influencing automated decision-making algorithms in ways that are challenging to trivially detect by manual or automated inspection, adding an additional tool for campaigns designed to covertly misinform. In closely related efforts, the design of strategies for attack is clearly the first stage in developing classification strategies for key decisions with reduced susceptibility to adversarial practices. Finally, the creation of adversarial spectra may provide a means of producing additional realistic training data to aid in the development of classifiers from limited data sets.

Example 1

The present example includes a method for launching a "blind" digital adversarial spectroscopic attack and explore the statistical impacts such attacks produce. In designing the attacks, the perturbations were introduced to affect classification in a reduced-dimensional space defined by linear discriminant analysis (LDA). Some motivations for this work include: i) identify the nature of the perturbations that optimally produce misclassification, ii) provide a test-bed for development of forensic methods to retro-actively detect digital manipulation, and iii) enable a framework for subsequent development of classification strategies less susceptible to adversarial attacks.

The central objective of the adversarial attack is to identify the perturbation, δ, that optimally alters the classification of an initial spectrum to a target group, subject to constraints imposed by a cost function. For the initial sample spectrum $x_s$, the perturbed spectrum is given by $x'=x_s+\delta$, in which δ is the perturbation. The general strategy in optimization of δ is illustrated in FIG. 5, which is intended to serve as a graphical depiction of an attack implemented in a reduced-dimensional space.

For example, these reduced dimensions may represent the principal axes produced by linear discriminant or principal component analyses. Each wavelength channel in the original spectral space results in a "nudge" to collectively contribute to the position of the spectrum in the reduced dimensional space. While the primary spectral features (indicated by the black arrows) combined to dictate the general position within the reduced dimensional space, randomness within the noise (indicated by the short red arrows in FIGS. 5A and 5B) produces a spread about that mean position.

Figures 5A, 5B, 5C:
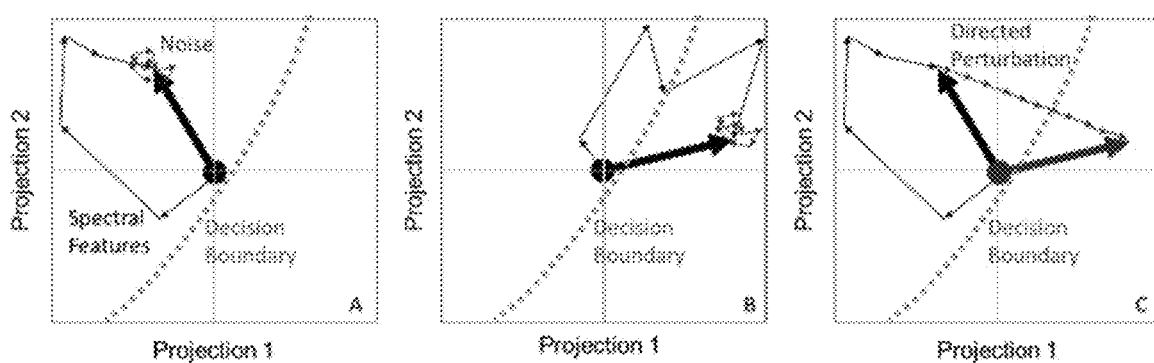
FIG. 5(a) illustrates that major spectral peaks drive the position of spectra in lower-dimension projections.
FIG. 5(b) illustrates another projection where major spectral peaks drive the position of spectra in lower-dimension projections.
FIG. 5(c) illustrates an of patterned perturbations in the vector δ that optimally relocates the position from the initial class A to target class B in this reduced dimensional space.

Addition of "nudges" by perturbation of the original spectrum can relocate the position of the initial spectrum in the reduced dimensional space to one significantly closer to the target, as illustrated in FIG. 5C. The vector of deviations d from the initial sample spectrum, $x_s$, to the "target", $\mu_t$, in the reduced dimensional space is given by the following expression: $d=D[(x_s+\delta)-\mu_t]$. In the absence of other considerations, the optimal perturbation, δ, will be one that maximizes the probability that the perturbed spectrum will be classified as the target. Assuming normally distributed noise, the maximum likelihood estimator is based on minimization of the sum of squared deviations, given by $\|d\|^2$. In the LDA-space, these squared deviations are evaluated following projection onto the reduced dimensional space through the matrix D, in which D is a matrix of eigenvectors for dimension reduction (e.g., LDA or PCA). In the present study, two dimensions in LDA-space were considered in the analysis of spectra with 1340 elements, such that D is a 2×1340 matrix. These eigenvectors are visualized in FIG. 5.

Optimization of the perturbation to transition the spectrum from the initial to the target classification was performed by minimization of the magnitude of the perturbation in the spectral domain for a constant displacement in LDA-space. The total cost function for the reduced dimensional analysis was given by the sum of the two terms, which collectively minimized the squared deviation to the target while minimizing the overall magnitude of the perturbation.

$$\hat{\delta} = \underset{\delta}{\operatorname{argmin}}[\|D(x_s + \delta - \mu_t)\|^2 + \beta\|\delta\|^2]$$

The scaling parameter β in the above equation allows for empirical adjustment of the importance given to proximity to target relative to minimizing perturbation to the major spectral features. In the present study, a value of β=1 was used for simplicity.

Optimization of δ was performed using a genetic algorithm, written in-house in MatLab2018b using two modifications for offspring generation: i) mutation and ii) splicing. Mutation was performed by randomly selecting a position (1 through 1340) and multiplying that positional value by a random number selected from a uniform distribution from −2 to 2 excluding zero (to prevent the perturbation from getting trapped in a local minimum) to generate a new spectrum from the parent spectrum. Splicing was performed by selecting a random position within a parent spectrum, all wavelengths beyond which were exchanged with the other parent spectrum to generate two new progenitor spectra. All progenitor spectra were scored and ranked based on the cost function given in the above equation, with the twenty top-scoring offspring serving as the "parents" for the next cycle of modification. The genetic algorithm was run for 400 generations with 2000 generated spectra per generation. Code for the genetic algorithm can be found in supporting information.

Raman spectra were acquired using a custom Raman microscope, built in-house and described in detail previously. In brief, a continuous wave diode laser (Toptica, 785 nm wavelength) coupled into a Raman probe (InPhotonics, RPS785/24) was collimated by a fused silica lens, and directed through an X-Y scan head composed of two galvanometer scanning mirrors. Two additional fused silica lenses formed a 4f configuration to deliver a collimated beam on the back of a 10× objective (Nikon). The Raman signal from the sample was collected through the same objective and descanned back through the same beam path into the Raman probe. A notch filter was built in the Raman probe to reject the laser signal. Raman spectra were acquired using an Acton SP-300i spectrometer with a 100×1340 CCD array, and controlled by a computer running WinSpec32 software. Pure clopidogrel bisulfate Form I and Form II were produced in-house at Dr. Reddy's Laboratories. Both the Form I and Form II particles were spherical with similar particle size distributions (diameter: ~25 μm). The laser power measured at the sample was ~30 mW. The exposure time was 0.5 s per spectral frame. To achieve higher signal to noise ratio for high quality training data for classification, 30 consecutive frames were averaged for each spectrum acquired over a spot size of ~2-3 μm diameter within the field of view. A Savitzky-Golay filter was applied to smooth the spectra, and a rolling ball filter was used to remove the fluorescence background. Finally, the spectra were normalized to their integrated intensities, i.e., the area under the curves.

Figure 6A:
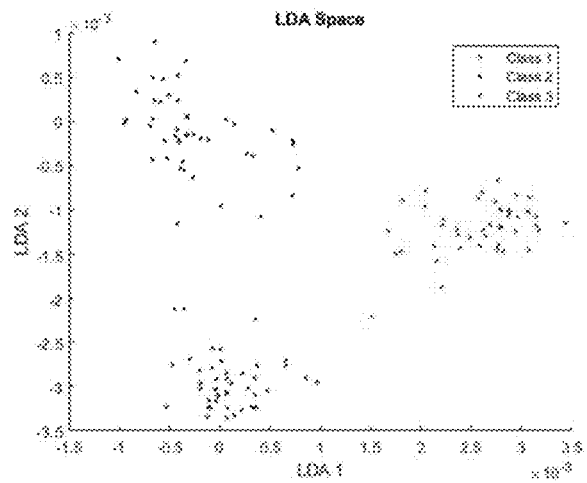
FIG. 6(a) illustrates a projection of experimental Raman spectra in LDA-space.
Figure 6B:
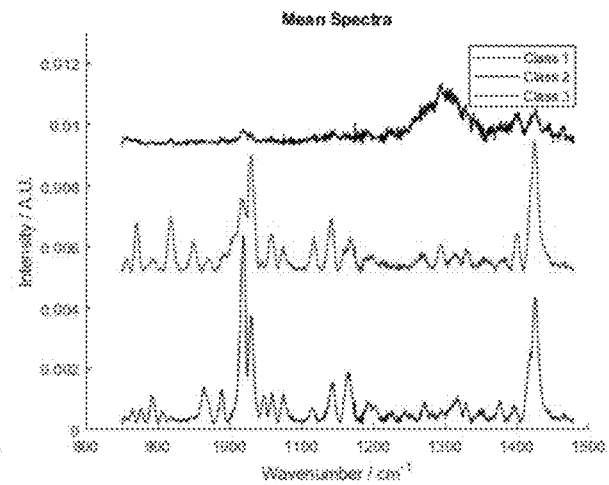
FIG. 6(b) illustrates a projection of experimental Raman spectra in mean spectra.

The mean spectra, average of 84 measurements, for three classes are shown in FIG. 6. The spectra corresponding to the background were classified as class 3 (top spectra, black). The spectra belonging to the two polymorphs of clopidogrel bisulfate were classified as classes 1 and 2 (red, middle and blue, bottom trace respectively). The recorded spectra for class 3, identified as background, shared one major feature of note, that being a large rolling peak around 1280 $cm^{-1}$. Spectra collected for classes 1 and 2 showed clearly notable differences distinguishable by the relative peak intensities of the major features at ~1019 & 1030 $cm^{-1}$, along with numerous minor peaks present in one or the other of the two sets of spectra. Linear discriminant analysis provided clear separation between the different spectral classes upon dimension reduction.

Figure 7:
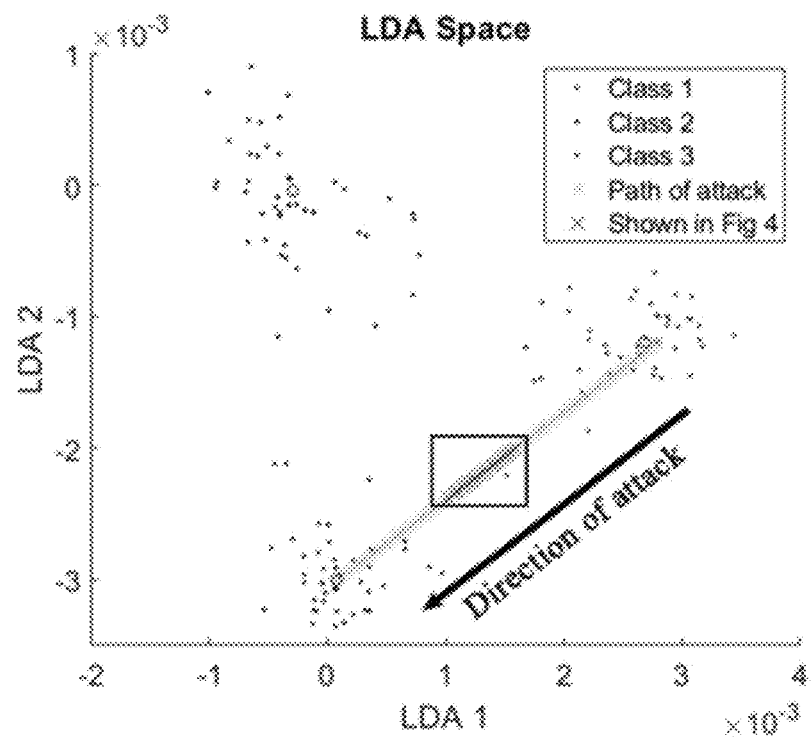
FIG. 7 illustrates demonstration of an incremental attack from Class 1 to Class 2.
Figure 8:
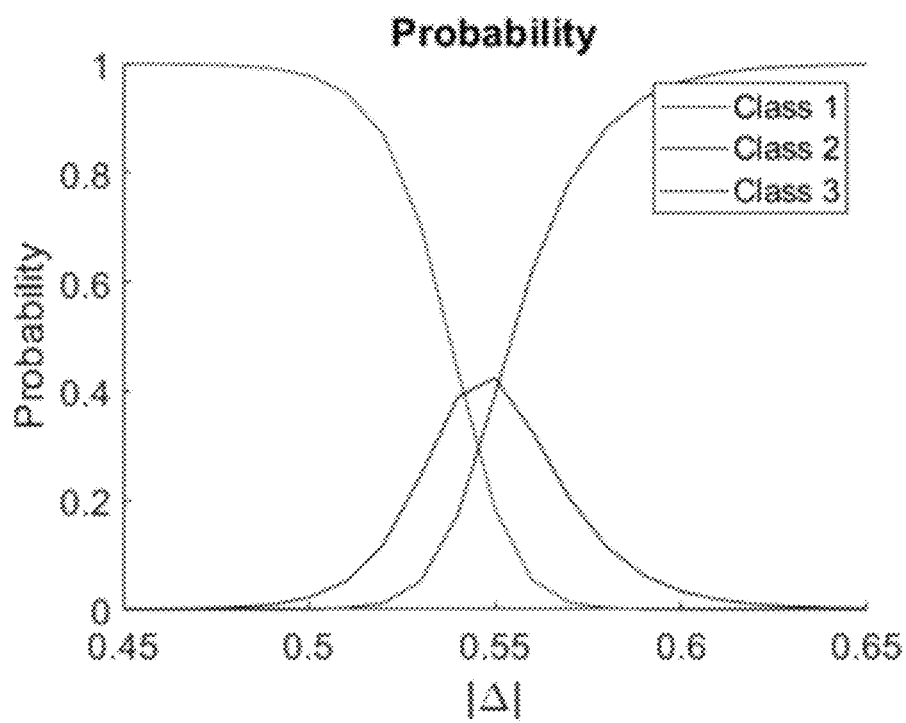
FIG. 8 illustrates a probability of the perturbation belonging to each class in the region of greatest uncertainty.

Using this data set of 252 spectra, the results of an "attack" in the reduced-dimensional LDA space are shown in FIG. 7. In brief, the perturbation was designed to displace the initial spectrum toward the target class within the reduced dimensional space. Because of the reduction in dimension, the direction of perturbation δ is underdetermined, such that an infinite combination of perturbations can be constructed to move in the direction toward the target. The optimal perturbation was selected based on the cost function given by the above stated equation, in which the Euclidean distance to the target in the LDA-space was minimized while also minimizing the overall magnitude of the perturbation in spectral-space. This approach resulted in patterns of perturbation shown in FIGS. 7-10. The attack in FIG. 7 was designed to move a spectrum from class 1 (middle right, red) to class 2 (bottom left, blue). The green x's represent the optimized perturbation, along the path from initial to target classification represented by |Δl|, where Δ=0 corresponds to the initial, unperturbed spectrum and Δ=1 corresponds to the perturbed spectrum positioned at the mean of the target class in LDA-space. The purple x's, highlighted in the boxed section of FIG. 7 indicate the region over which the probability classification transitions from initial to target class. This region on interest is highlighted in FIG. 8.

Figure 9:
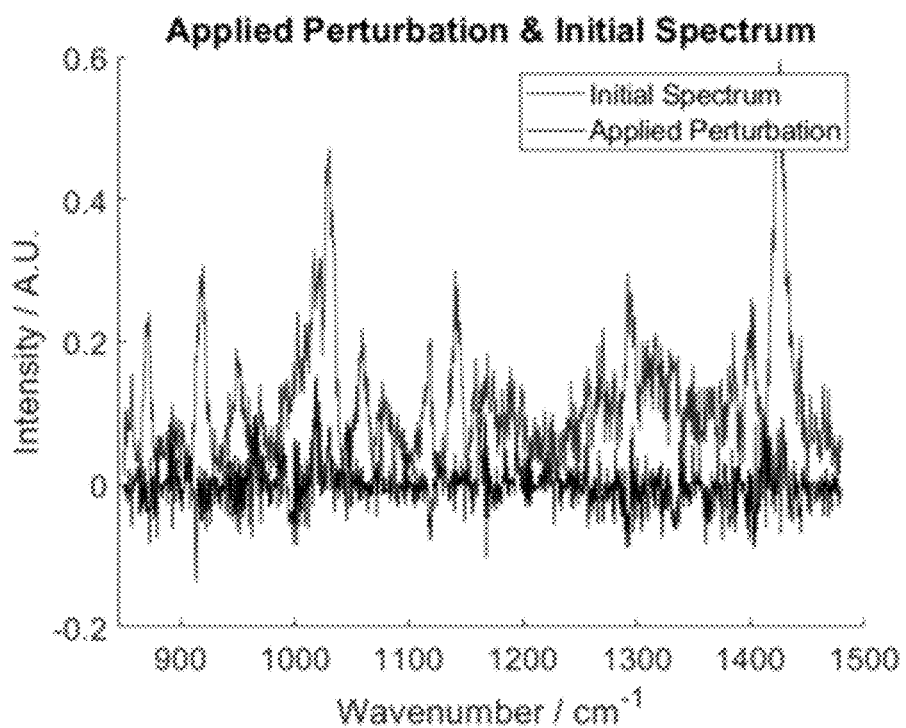
FIG. 9 illustrates comparison of the initial spectrum (top) and the applied perturbation (bottom)
Figure 10:
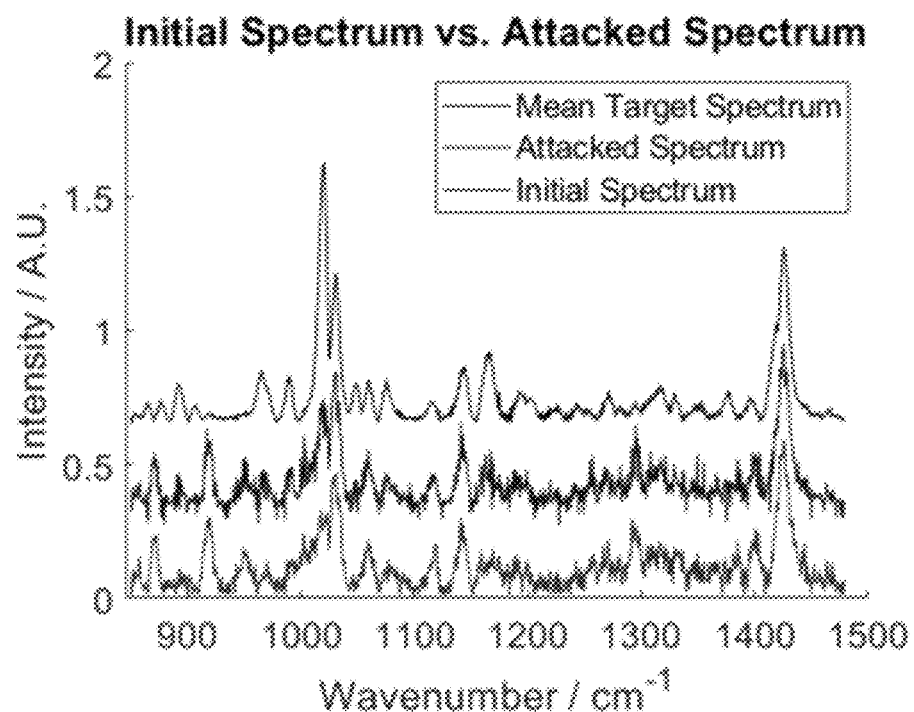
FIG. 10 illustrates comparison of the initial spectrum (bottom) with the attacked spectrum (middle), and the mean target spectrum (top).

Interestingly, the perturbations that optimally produce changes in classification are not due to changes in the major spectral features, as one might initially anticipate. Indeed, it is visually difficult to detect the perturbations in spectral space that squarely relocates the spectra to the target class in the reduced dimensional space (≥95% confidence). FIG. 9 shows the perturbation applied (black data trace) in order to achieve a misclassification. In FIG. 10, inspection of the perturbed spectra for reclassification from class 1 to class 2 suggests strong visual similarities to the initial classification corresponding to the source, despite high statistical confidence in classification as the target following perturbation. The dominance of high frequency content in the perturbation highlights the significance of the variance of the signal in both the initial and target spectra, which appears to drive much of the spectral power in inducing misclassification. This outcome is somewhat surprising, as no constraints other than proximity to target and minimization of magnitude were imposed on the cost function given in the above equation.

The relative magnitudes of the perturbations required to confidently induce misclassification are surprisingly small. Comparison of the magnitudes of the perturbations relative to the initial spectrum suggest that perturbations on the order of 12% of the initial spectrum intensity are sufficient to unequivocally alter the spectral classification. The graphical depiction in FIG. 5 may provide some insights regarding the absence of similarity between the perturbation with either the initial or target spectra. From inspection of the figure, the most direct path from the initial to the target in the reduced dimensional space will generally not pass through the origin. As such, reductions of the major peaks in the initial spectrum and growth of the major peaks for the target spectrum will not generally correspond to the optimal perturbation.

These results highlight the growing challenges in ensuring statistical validity in regulatory, business, and legal decisions derived from data-intensive measurements that may be subject to intentional but subtle perturbation. As demonstrated herein, adversarial attacks on spectral information can profoundly influence decision outcomes, even when the perturbations are challenging to visually identify upon manual inspection. These results demonstrate that even subtle digital alteration of files used in the otherwise benign operation of background subtraction can result in dramatically different outcomes in decision-making based on spectral analysis. Such relatively subtle changes spread over the entire spectrum would generally be challenging to discriminate from random noise. As the volume of data integrated for decision-making increases along with the corresponding degree of pre-processing required for data mining, chemical decision-making is only poised to be increasingly susceptible to manipulation through adversarial perturbations.

Solutions to this inherent vulnerability are nontrivial. Data provenance can provide a measure of security against digital manipulation, but is often limited to the post-processed output. Early stage digital manipulation such as alternation of the background subtraction may not be readily identified through provenance assurance. For large data sets, complete retention and distribution of the raw data may not be practical and greatly reduces the down-stream benefits of data-intensive decision-making.

Spectral features were identified and analyzed for optimally induce misclassification of an initial spectrum to a target class in a reduced-dimensional space. Interestingly, optimized perturbations did not contain obvious spectral features associated with either the initial or target class spectra, but rather appeared as noisy, featureless traces. Despite these appearances, the optimized patterns unequivocally produced misclassification from perturbations with median amplitudes only ~12% of that in the initial spectrum. These results highlight the hidden importance of residual high frequency content in defining the selection of principal coordinates for dimension reduction. Awareness of this implicit sensitivity to unexpected high frequency spectral features in dictating classification may provide routes for improving robustness of dimension reduction methods and spectral classifiers to both noisy data and intentional alternations.

Example 2

A method for inducing a covert misclassification performed on a non-transitory computer readable medium, the method includes identifying a target position. The method further includes creating a spectral perturbation tensor. The spectral perturbation tensor is configured to shift a projection of an initial spectrum towards the target position. Additionally, the method includes combining the spectral perturbation tensor to the initial spectrum. Further, the method includes classifying the combination of the spectral perturbation tensor and the initial spectrum with an established classifier, thereby designing the spectral perturbation tensor such that the combination is misclassified.

The spectral perturbation tensor includes a plurality of amplitude modifications. The target position is dependent upon a target class, while the target position includes a projection of a mean spectrum of the target class. In some embodiments, the target position includes a projection of an individual spectrum of the target class.

The identifying the target position includes reducing a dimensionality of a space containing the target position. In one or more embodiments, the target position is in the space, where the space has a dimension number that is smaller than a length of the initial spectrum. The reducing the dimensionality of the space containing the target position includes at least one of: using linear discriminant analysis for reducing the dimensionality of the space; using principal component analysis for reducing the dimensionality of the space; using artificial neural networks for reducing the dimensionality of the space; using singular value decomposition for reducing the dimensionality of the space; or using non-negative matrix factorization for reducing the dimensionality of the space.

The creating the spectral perturbation tensor includes identifying a target spectrum that would be classified as the target class; calculating a difference spectrum from the target spectrum and the initial spectrum; weighting each element of the difference spectrum based on a respective magnitude of an element of the difference spectrum, thereby creating a weighted difference spectrum; and calculating a spectral perturbation tensor from the weighted difference spectrum.

In at least one embodiment, the creating the spectral perturbation tensor includes identifying a target spectrum that would be classified as the target class; calculating a difference spectrum from the target spectrum and the initial spectrum; weighting each element of the difference spectrum based on a Fourier transformation of the difference spectrum, thereby creating a weighted difference spectrum; and calculating a spectral perturbation tensor from the weighted difference spectrum.

The combining the spectral perturbation to the initial spectrum includes adding the spectral perturbation to the initial spectrum. In various embodiments, the classifying the combination of the spectral perturbation and the initial spectrum with the established classifier includes at least one of: using a support vector machine for the classifying; or using an artificial neural network for the classifying.

In various embodiments, the established classifier includes at least one of a support vector machine, an artificial neural network, or a decision tree.

In various embodiments, the classifying the combination of the spectral perturbation tensor and the initial spectrum with the established classifier, thereby designing the spectral perturbation tensor such that the combination is misclassified includes generating a set of eigenvectors for linear discriminate analysis; projecting the combination of the spectral perturbation tensor and the initial spectrum; and identifying a classification based on a support vector machine.

In some embodiments, the classifying the combination of the spectral perturbation tensor and the initial spectrum with the established classifier, thereby designing the spectral perturbation tensor such that the combination is misclassified includes generating a set of eigenvectors for principal component analysis; projecting the combination of the spectral perturbation tensor and the initial spectrum; and identifying a classification based on a support vector machine.

In some embodiments, the classifying the combination of the spectral perturbation tensor and the initial spectrum with the established classifier, thereby designing the spectral perturbation tensor such that the combination is misclassified includes generating a set of eigenvectors for linear discriminate analysis; projecting the combination of the spectral perturbation tensor and the initial spectrum; and identifying a classification based on an artificial neural network.

In some embodiments, the classifying the combination of the spectral perturbation tensor and the initial spectrum with the established classifier, thereby designing the spectral perturbation tensor such that the combination is misclassified includes generating a set of eigenvectors for principal component analysis; projecting the combination of the spectral perturbation tensor and the initial spectrum; and identifying a classification based on an artificial neural network.

In some embodiments, the classifying the combination of the spectral perturbation tensor and the initial spectrum with the established classifier, thereby designing the spectral perturbation tensor such that the combination is misclassified includes reducing the dimensionality of the space by using non-negative matrix factorization; and discriminating class of the combination of the spectral perturbation tensor and the initial spectrum within the resulting decomposition by the established classifier, wherein the established classifier includes a support vector machine or an artificial neural network.

In some embodiments, the classifying the combination of the spectral perturbation tensor and the initial spectrum with the established classifier, thereby designing the spectral perturbation tensor such that the combination is misclassified includes reducing the dimensionality of the space by using singular value decomposition; and discriminating class of the combination of the spectral perturbation tensor and the initial spectrum within the resulting decomposition by the established classifier, wherein the established classifier includes a support vector machine or an artificial neural network.

Example 3

A system architecture for inducing a covert misclassification, the system architecture encoded on a non-transitory computer readable medium, the system architecture includes a first protocol, wherein the first protocol is configured to identify a target position. The system architecture further includes a second protocol, wherein the second protocol is configured to create a spectral perturbation tensor. The spectral perturbation tensor is configured to shift a projection of an initial spectrum towards the target position. Additionally, the system architecture includes a third protocol, wherein the third protocol is configured to combine the spectral perturbation tensor to the initial spectrum. Further, the system architecture includes a fourth protocol, wherein the fourth protocol is configured to classify the combination of the spectral perturbation tensor and the initial spectrum with an established classifier, thereby designing the spectral perturbation tensor such that the combination is misclassified.

The spectral perturbation tensor includes a plurality of amplitude modifications. The target position is dependent upon a target class, while the target position includes a projection of a mean spectrum of the target class. In some embodiments, the target position includes a projection of an individual spectrum of the target class.

The first protocol includes a fifth protocol, wherein the fifth protocol is configured to reduce a dimensionality of a space containing the target position. In one or more embodiments, the target position is in the space, where the space has a dimension number that is smaller than a length of the initial spectrum. The fifth protocol includes at least one of: a sixth protocol, wherein the sixth protocol is configured to use linear discriminant analysis for reducing the dimensionality of the space; a seventh protocol, wherein the seventh protocol is configured to use principal component analysis for reducing the dimensionality of the space; an eighth protocol, wherein the eighth protocol is configured to use artificial neural networks for reducing the dimensionality of the space; a ninth protocol, wherein the ninth protocol is configured to use singular value decomposition for reducing the dimensionality of the space; or a tenth protocol, wherein the tenth protocol is configured to use non-negative matrix factorization for reducing the dimensionality of the space.

The second protocol includes a tenth protocol, wherein the tenth protocol is configured to identify a target spectrum that would be classified as the target class; an eleventh protocol, wherein the eleventh protocol is configured to calculate a difference spectrum from the target spectrum and the initial spectrum; a twelfth protocol, wherein the twelfth protocol is configured to weight each element of the difference spectrum based on a respective magnitude of an element of the difference spectrum, thereby creating a weighted difference spectrum; and a thirteenth protocol, wherein the thirteenth protocol is configured to calculate a spectral perturbation tensor from the weighted difference spectrum.

In at least one embodiment, the second protocol includes a fourteenth protocol, wherein the fourteenth protocol is configured to identify a target spectrum that would be classified as the target class; a fifteenth protocol, wherein the fifteenth protocol is configured to calculate a difference spectrum from the target spectrum and the initial spectrum; a sixteenth protocol, wherein the sixteenth protocol is configured to weight each element of the difference spectrum based on a Fourier transformation of the difference spectrum, thereby creating a weighted difference spectrum; and a seventeenth protocol, wherein the seventeenth protocol is configured to calculating a spectral perturbation tensor from the weighted difference spectrum.

The third protocol includes an eighteenth protocol, wherein the eighteenth protocol is configured to add the spectral perturbation to the initial spectrum. In various embodiments, the fourth protocol includes at least one of: a nineteenth protocol, wherein the nineteenth protocol is configured to use a support vector machine for the classifying; or twentieth protocol, wherein the twentieth protocol is configured to use an artificial neural network for the classifying.

In various embodiments, the established classifier includes at least one of a support vector machine, an artificial neural network, or a decision tree.

In various embodiments, the fourth protocol includes a twenty-first protocol, wherein the twenty-first protocol is configured to generate a set of eigenvectors for linear discriminate analysis; a twenty-second protocol, wherein the twenty-second protocol is configured to project the combination of the spectral perturbation tensor and the initial spectrum; and a twenty-third protocol, wherein the twenty-third protocol is configured to identify a classification based on a support vector machine.

In some embodiments, the fourth protocol includes a twenty-fourth protocol, wherein the twenty-fourth protocol is configured to generate a set of eigenvectors for principal component analysis; the twenty-second protocol; and the twenty-third protocol.

In some embodiments, the fourth protocol includes twenty-seventh protocol, wherein the twenty-seventh protocol is configured to generate a set of eigenvectors for linear discriminate analysis; twenty-eighth protocol, wherein the twenty-eighth protocol is configured to project the combination of the spectral perturbation tensor and the initial spectrum; and a twenty-ninth protocol, wherein the twenty-ninth protocol is configured to identify a classification based on an artificial neural network.

In some embodiments, the fourth protocol includes the twenty-fourth protocol; the twenty-fifth protocol; and the twenty-ninth protocol.

In some embodiments, the fourth protocol includes a thirtieth protocol, wherein the thirtieth protocol is configured to reduce the dimensionality of the space by using non-negative matrix factorization; and a thirty-first protocol, wherein the thirty-first protocol is configured to discriminate class of the combination of the spectral perturbation tensor and the initial spectrum within the resulting decomposition by the established classifier, wherein the established classifier includes a support vector machine or an artificial neural network.

In some embodiments, the fourth protocol includes thirty-second protocol, wherein the thirty-second protocol is configured to reduce the dimensionality of the space by using singular value decomposition; and the thirty-first protocol.

Figure 11:
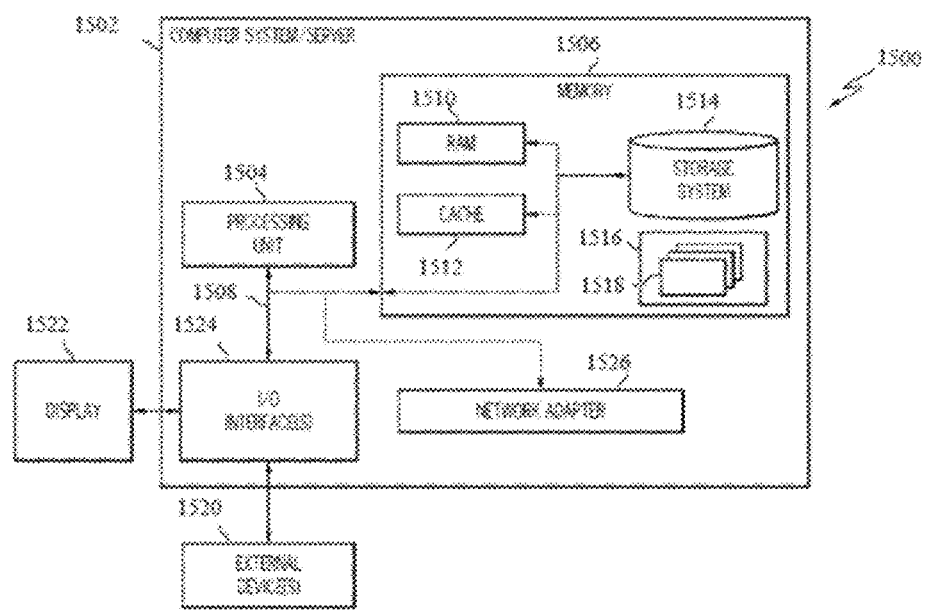
FIG. 11 illustrates one example of a computing or processing node 1500 for operating the methods and the software architecture of the present application.

FIG. 11 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory machine-readable storage medium having a machine-readable program stored therein, wherein the machine-readable program, when executed on a processing system, causes the processing system to perform a method of producing a set of generated data operable to induce a covert misclassification of a data input, wherein the method comprises:
receiving a high dimensional space input data representing a spectrum from a generator of a generative adversarial network (GAN) from a data storage media;
identifying a target dataset, wherein the target dataset represents a reduced dimensional representation of the high dimensional space input data with a perturbation;
creating a spectral perturbation tensor, wherein the spectral perturbation tensor is configured to shift the high dimensional space input data to generate a low dimensional dataset;
defining a function based on the spectral perturbation tensor, the low dimensional dataset, and the target dataset;
adjusting the spectral perturbation tensor by determining a minimum of the defined function to optimize the perturbation, thereby generating an obtained low dimensional dataset approximating the target low dimensional dataset;
obtaining an output high dimensional dataset based on a combination of the high dimensional space input data and the adjusted spectral perturbation tensor;
outputting the output high dimensional dataset; and
classifying the output high dimensional dataset with an established classifier to a misclassified classification.

2. The non-transitory machine-readable storage medium of claim 1, wherein the spectral perturbation tensor comprises a plurality of amplitude modifications configured to generate new data outputs from the high dimensional space input data.

3. The non-transitory machine-readable storage medium of claim 1, wherein the target dataset is dependent upon a target class.

4. The non-transitory machine-readable storage medium of claim 3, wherein the target dataset comprises a projection of a mean spectrum of the target class.

5. The non-transitory machine-readable storage medium of claim 3, wherein the target dataset comprises a projection of an individual spectrum of the target class.

6. The non-transitory machine-readable storage medium of claim 5, wherein the reduced dimensional representation of the high dimensional space input data with a perturbation is generated based at least on one of:
using linear discriminant analysis for reducing the dimensionality;
using principal component analysis for reducing the dimensionality;
using artificial neural networks for reducing the dimensionality;
using singular value decomposition for reducing the dimensionality; or
using non-negative matrix factorization for reducing the dimensionality.

7. The non-transitory machine-readable storage medium of claim 1, wherein the determining the spectral perturbation comprises:
adding a spectral perturbation to the high dimensional space input data.

8. The non-transitory machine-readable storage medium of claim 1, wherein the classifying the output high dimensional dataset with the established classifier comprises at least one of:
using a support vector machine for the classifying; or
using an artificial neural network for the classifying.

9. The non-transitory machine-readable storage medium of claim 1, wherein the established classifier comprises at least one of a support vector machine, an artificial neural network, or a decision tree.

10. The non-transitory machine-readable storage medium of claim 1, wherein the classifying the output high dimensional dataset with the established classifier, comprises:
generating a set of eigenvectors for linear discriminate analysis;
projecting the combination of the spectral perturbation tensor and the high dimensional space input data; and
identifying a classification based on a support vector machine.

11. The non-transitory machine-readable storage medium of claim 1, wherein the classifying the output high dimensional dataset with the established classifier, comprises:
generating a set of eigenvectors for principal component analysis;
projecting a combination of the spectral perturbation tensor and the high dimensional space input data; and
identifying a classification based on a support vector machine.

12. The non-transitory machine-readable storage medium of claim 1, wherein the classifying the output high dimensional dataset with the established classifier, comprises:
generating a set of eigenvectors for linear discriminate analysis;
projecting the combination of the spectral perturbation tensor and the high dimensional space input data; and
identifying a classification based on an artificial neural network.

13. The non-transitory machine-readable storage medium of claim 1, wherein the classifying the output high dimensional dataset with the established classifier, comprises:
generating a set of eigenvectors for principal component analysis;
projecting the combination of the spectral perturbation tensor and the high dimensional space input data; and
identifying a classification based on an artificial neural network.

14. The non-transitory machine-readable storage medium of claim 1, wherein the classifying the output high dimensional dataset with the established classifier, comprises:
reducing a dimensionality of a space by using non-negative matrix factorization; and
discriminating between a class of the combination of the high dimensional space input data and the adjusted spectral perturbation tensor, wherein the established classifier comprises a support vector machine or an artificial neural network.

* * * * *